US009092085B2

(12) United States Patent
Chow

(10) Patent No.: US 9,092,085 B2
(45) Date of Patent: Jul. 28, 2015

(54) CONFIGURING A TOUCHPAD SETTING BASED ON THE METADATA OF AN ACTIVE APPLICATION OF AN ELECTRONIC DEVICE

(75) Inventor: John W Chow, Taipei (TW)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 151 days.

(21) Appl. No.: 14/009,106

(22) PCT Filed: Apr. 22, 2011

(86) PCT No.: PCT/US2011/033539
§ 371 (c)(1),
(2), (4) Date: Sep. 30, 2013

(87) PCT Pub. No.: WO2012/145008
PCT Pub. Date: Oct. 26, 2012

(65) Prior Publication Data
US 2014/0267052 A1  Sep. 18, 2014

(51) Int. Cl.
G06F 3/0354 (2013.01)
G06F 3/041 (2006.01)
G06F 3/02 (2006.01)
G06F 3/038 (2013.01)

(52) U.S. Cl.
CPC  *G06F 3/041* (2013.01); *G06F 3/02* (2013.01); *G06F 3/038* (2013.01); *G06F 3/03547* (2013.01)

(58) Field of Classification Search
None
See application file for complete search history.

(56) References Cited

U.S. PATENT DOCUMENTS

| 8,054,300 | B2 * | 11/2011 | Bernstein | 345/174 |
|---|---|---|---|---|
| 2004/0104895 | A1 | 6/2004 | Rekimoto | |
| 2004/0177319 | A1 * | 9/2004 | Horn | 715/501.1 |
| 2005/0057489 | A1 | 3/2005 | Kung et al. | |
| 2006/0109252 | A1 | 5/2006 | Kolmykov-Zotov et al. | |
| 2007/0091070 | A1 * | 4/2007 | Larsen et al. | 345/168 |
| 2008/0088597 | A1 | 4/2008 | Prest et al. | |
| 2008/0158145 | A1 * | 7/2008 | Westerman | 345/156 |
| 2010/0058251 | A1 | 3/2010 | Rottler et al. | |
| 2010/0328236 | A1 * | 12/2010 | Ma | 345/173 |
| 2011/0291922 | A1 * | 12/2011 | Stewart et al. | 345/156 |

OTHER PUBLICATIONS

ISA/KR, International Search Report mailed Jan. 2, 2012, Int'l App No. PCT/US2011/033539, filed Apr. 22, 2011.
Nakodari, "Auto Disable Mouse Touchpad When Typing," Retrieved from Internet on Nov. 30, 2010, <http://www.webupd8.org/2009/11/ubuntu-automatically-disable-touchpad.html>.
"How to enable touchpad while typing?" Notebook Review, Retrieved from Internet on Sep. 18, 2013,<http://forum.notebookreview.com/hardware-components-aftermarket-upgrades/445272-how-enable-touchpad-while-typing.html>.

(Continued)

Primary Examiner — Patrick F Marinelli
Assistant Examiner — Chad Dicke
(74) Attorney, Agent, or Firm — Hewlett-Packard Patent Department

(57) ABSTRACT

A device to identify an active application in focus, determine a genre of the active application with metadata of the active application, and modify a palm check setting for a touchpad of the device based on the genre of the active application.

18 Claims, 7 Drawing Sheets

(56) References Cited

OTHER PUBLICATIONS

Ubuwu, "Idea #126: Disable touchpad while typing," Ubuntu Brainstorm, retrieved from Internet on Nov. 30, 2013, <http://brainstorm.ubuntu.com/item/126/>.

"Ubuntu: Automatically Disable TouchPad Whiie Typing," 2WEB UPD8, Nov. 9, 2009, <http://www.webupd8.org/2009/11/ubuntu-automatically-disable-touchpad.html>.

* cited by examiner

CONFIGURING A TOUCHPAD SETTING BASED ON THE METADATA OF AN ACTIVE APPLICATION OF AN ELECTRONIC DEVICE

BACKGROUND

A touchpad is an input component which can detect a user touching the touchpad and register the touch as an input for a device. In some cases, while using another input component, such as a keyboard, the user can accidentally touch or brush against the touchpad. In response to the user touching or brushing against the touchpad, the device can detect the accidental inputs of the user and proceed to reposition a cursor or pointer on a user interface of the device to an undesired location of the user interface. This can lead to delays and frustration for the user as the user spends time remedying the unintended inputs from the touchpad.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the disclosed embodiments.

DETAILED DESCRIPTION

A device can include one or more applications which can be rendered and/or executed on the device. Additionally, the device can identify an active application rendered and/or executed on the device. In one embodiment, an application can be active if the application is running on the device and a user interface of the application is rendered for display on the device. In another embodiment, the application can be active if a cursor or a pointer of the device is hovering over the application. In other embodiments, the application can be active if the user uses an input component of the device to click on or to select the application. The input component can be a touchpad or a keyboard.

In response to identifying an active application, the device can access metadata of the active application to identify a genre of the application. By identifying the genre of the active application, the device can identify an input pattern of the genre. Based on the input pattern of the genre, the device can determine whether the genre of the active application receives input from both the touchpad and the keyboard. Additionally, the device can determine whether the genre of the active application receives more input from the touchpad or the genre of the active application receives more input from the keyboard.

In response to identifying the genre of the active application and an input pattern of the genre, the device can proceed to modify one or more settings of the touchpad, such as a palm check setting. By modifying the palm check setting, the device can modify a sensitivity of the touchpad to increase the detection of accidental inputs of the touchpad if the genre of the active application receives more input from the keyboard as opposed to the touchpad.

As a result, the amount of accidental inputs from the touchpad can be reduced while the user enters input with the keyboard for applications which receive more inputs from the keyboard, such as word processing or spread sheet applications. Additionally, the device can modify a sensitivity of the touchpad to decrease the detection of accidental inputs of the touch pad if the genre of the application receives more input from the touchpad as opposed to the keyboard. As a result, an accuracy of the touchpad can be increased for applications which receive more inputs from the touchpad, such as media or game applications.

Figure 1:
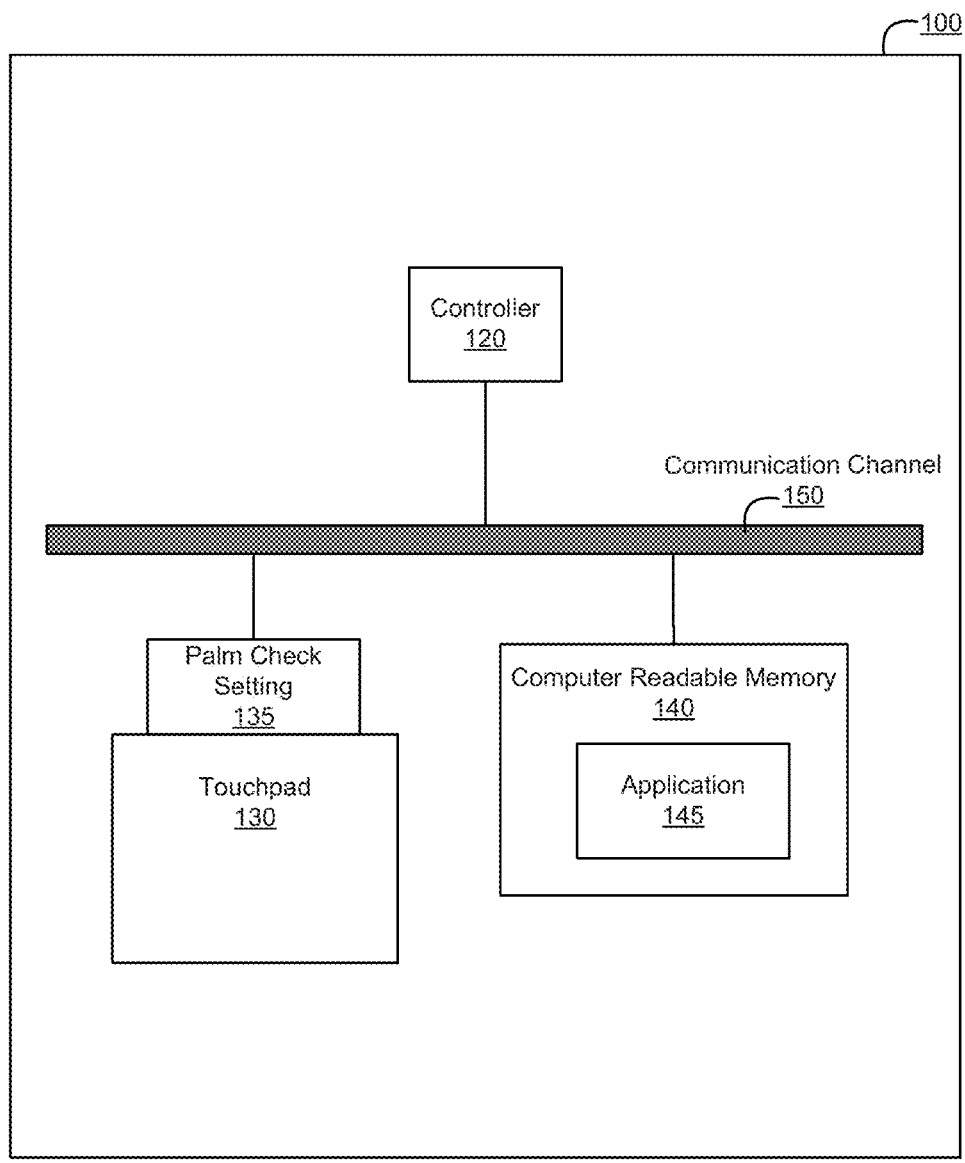
FIG. 1 illustrates a device with a touchpad according to an embodiment.

FIG. 1 illustrates a device 100 with a touchpad 130 according to an embodiment. The device 100 can be a laptop, a netbook, a tablet, an all-in-one system, a desktop, a server, and/or the like. In another embodiment, the device 100 is a cellular device, a PDA (personal digital assistant), an E (electronic) Book/Reader and/or any additional device which can include a touchpad 130. As shown in FIG. 1, the device 100 includes a controller 120, a touchpad 130, an input component 150, computer readable memory 140, and a communication channel 150 for the device 100 and/or one or more components of the device 100 to communicate with one another.

The computer readable memory 140 can be a storage device coupled to the device 100 and include one or more applications 145 which can be rendered or executed on the device 100. In another embodiment, the computer readable memory 140 can additionally include a touch application. In other embodiments, the device 100 includes additional components and/or is coupled to additional components in addition to and/or in lieu of those noted above and illustrated in FIG. 1.

As noted above, the device 100 includes a controller 120. The controller 120 sends data and/or instructions to the components of the device 100, such as the touchpad 130, the input component 150, one or more application 145, and/or the touch application. Additionally, the controller 120 receives data and/or instruction from components of the device 100, such as the touchpad 130, the input component 150, one or more application 145, and/or the touch application.

The touch application is an application which can be used independently and/or in conjunction with the controller 120 to manage the touchpad 130. For the purposes of this application, the touchpad 130 is a hardware input component of the device 100 configured to detect an input for the device 100 in response to a user touching the touchpad 130. When managing the touchpad 130, the controller 120 and/or the touch application can modify one or more settings of the touchpad 130, such as a palm check setting 135.

One or more settings of the touchpad 130 can be modified based on a genre of an application 145 identified by the controller 120 and/or the touch application to be active. An application 145 can be any software application which can be rendered on the device 100 and/or executable by the controller 120 and/or the array application on the device 100. In one embodiment, an application 145 can be identified by the controller 120 and/or the array application to be active if no other the application of the device is currently open or running.

Additionally, the application 145 can be identified to be active if the application is currently rendered on a display component of the device 100. In another embodiment, the application 145 can be identified to be active if a cursor rendered on the display component is hovering over the application 145. In other embodiments, the application 145 can be identified to be active if the user accesses the application 145 by clicking or selecting the application 145 with the touchpad 130 or another input component of the device.

In response to identifying an active application 145, the controller 120 and/or the touch application can detect information of the active application 145. The controller 120 and/or the touch application can access metadata of the active application 145 to identify a genre of the active application 145. For the purposes of this application, a genre of an application 145 corresponds to a type or a category of the application 145. In one embodiment, the genre of the application 145 can be word processing, data management, searching, social networking, presentation, gaming, news, and/or multimedia. In other embodiment, the application 145 can be additional genres of applications in addition to and/or in lieu of those noted above.

By identifying a genre of the active application 145, the controller 120 and/or the touch application can identify an input pattern of the active application 145 and determine whether the active application 145 receives input from both the touchpad 130 and the input component 150, such as the keyboard. Additionally, the controller 120 and/or the touch application can determine whether the active application 145 receives more input from the touchpad 130 or the active application 145 receives more input from the input component 150.

Based on the genre of the active application 145 and the input pattern of the active application 145, the controller 120 and/or the touch application can modify a palm check setting 135 of the touchpad 130. For the purposes of this application, the palm check setting 135 is a setting or profile of the touchpad 130 associated with a sensitivity of the touchpad 130 to reject accidental contact or touching of the touchpad 130 by the user. The sensitivity of the touchpad 130 can correspond to a time delay before a touch is registered as an input for the device 100, an amount of pressure detected before the touch is registered as an input for the device 100, and/or an amount of surface area touched before the touch is registered as an input for the device 100. The user can accidentally contact or brush against the touchpad 130 when using another input component of the device 100.

The touch application can be firmware which is embedded onto the device 100 and/or the computer readable memory 140. In another embodiment, the touch application is a software application stored on the device 100 within ROM (read only memory). In other embodiments, the touch application can be stored and accessible to the device 100 or the computer readable memory 140 from a different location. Additionally, in one embodiment, the computer readable memory 140 is included in the device 100. In other embodiments, the computer readable memory 140 is not included in the device 100, but is accessible to the device 100 utilizing a network interface coupled to the device 100. The network interface can be a wired or wireless network interface card.

In a further embodiment, the touch application is stored and/or accessed through a server coupled through a local area network or a wide area network. The touch application communicates with devices and/or components coupled to the device 100 physically or wirelessly through a communication bus 150 included in or attached to the device 100. In one embodiment the communication bus 150 is a memory bus. In other embodiments, the communication bus 150 is a data bus.

Figure 2:
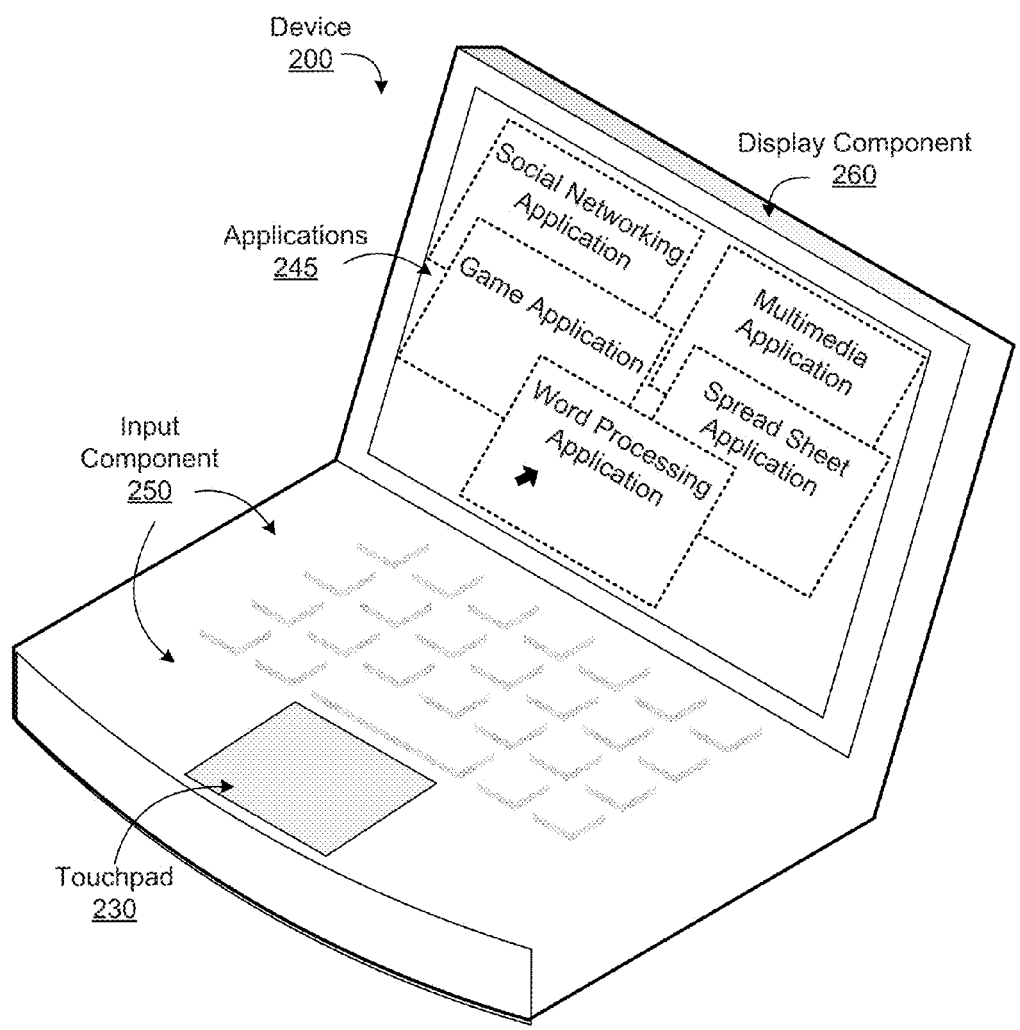
FIG. 2 illustrates a device with one or more applications according to an embodiment.

FIG. 2 illustrates a device 200 with one or more applications 245 according to an embodiment. One or more of the applications 245 can be a software application which can be rendered or executed on the device 200. Additionally, one or more of the applications 245 can receive inputs from a touchpad 230 and/or an input component 250. In one embodiment, one or more of the applications 245 can be a word processing application, a spread sheet application, a multimedia application, a social networking application, and/or a game application. In other embodiments, one or more applications 245 can be a web browser, a searching application, a presentation application, a news application, and/or any additional application which can be executed or rendered by the device 200.

One or more of the applications 245 can be stored and executed by the controller and/or the touch application from a computer readable memory coupled to the device 200. In another embodiment, one or more of the applications 245 can be stored on another device, such as a server, and remotely executed by the controller and/or the touch application. In other embodiments, one or more of the applications 245 are not executed by the controller and/or the touch application, but are remotely executed by another device and rendered for display on a display component 260 of the device 200.

The display component 260 can be a hardware component coupled to the device 200 configured to display one or more applications 245 which are executed or rendered by the device 200. In one embodiment, a display component 260 is a LCD (liquid crystal display), a LED (light emitting diode) display, a CRT (cathode ray tube) display, a plasma display, a projector, a touch wall and/or any additional device configured to display one or more applications 245.

As noted above, the controller and/or the touch application can identify an active application 245 on the device 200. For example, the active application 245 can be an application which a user of the device 200 is viewing, focusing on, or interacting with. When identifying an active application 245, the controller and/or the touch application can determine whether more than one application 245 is executed or rendered on the device 200. If only one application 245 is rendered and/or executed on the device, the controller and/or the touch application will identify the corresponding application 245 as the active application.

If more than one application 245 is executed or rendered, the controller and/or the touch application can determine whether any of the applications 245 are displayed on the display component 260. If only one application 245 is visible, the controller and/or the touch application will identify the corresponding application 245 to be the active application. In another embodiment, if more than application 245 is visible, the controller and/or the touch application can identify which application 245 is the top application. The top application is an application which overlaps other applications and is not overlapped by any another other application. The top application can be identified to be the active application.

In other embodiments, when identifying an active application 245, the controller and/or the touch application can determine whether the user has accessed one or more of the applications 245 with an input component 250 or the touchpad 230. An accessed application can be identified by the controller and/or the touch application to be an active application.

The touchpad 230 and the input component 230 are hardware input components of the device 200 configured to detect and receive inputs for the device 200. A user of the device 200 can use the touchpad 230 and/or the input component 250 to access and/or enter inputs for one or more of the applications 245. The user can access an application 245 and enter inputs for the application 245 by clicking or selecting the application 245 with the touchpad 230 and/or the input component 250. In another embodiment, the user can access and/or enter inputs for an application 245 by moving a cursor or pointer to hover or overlap the application 245.

As noted above the touchpad 230 is a hardware input component configured to detect inputs for the device 200 in response to the user touching the touchpad 230. In one embodiment, the touchpad 230 can include a touch sensitive pad or surface configured to detect a touch from the user. In another embodiment, the touchpad 230 can be a touch screen component. The user can touch the touchpad 230 with a finger, hand, palm, and/or with any additional part of the user's body. In another embodiment, the user can touch the touchpad using an accessory, such as a stylus.

An input component 250 is a hardware input component of the device 200 which can detect the user accessing an application and detect an input from the user. As shown in the present embodiment, the input component 250 can be a keyboard of the device 200. The keyboard can be a physical keyboard, a touch keyboard, and/or a projected keyboard. In another embodiment, the input component 250 can be an image capture component, a microphone, a mouse, and/or any additional component which the user can use to access an application 245 and can detect input from the user. Once an active application has been identified, the controller and/or the touch application can proceed to identify a genre of the application 245.

Figure 3:
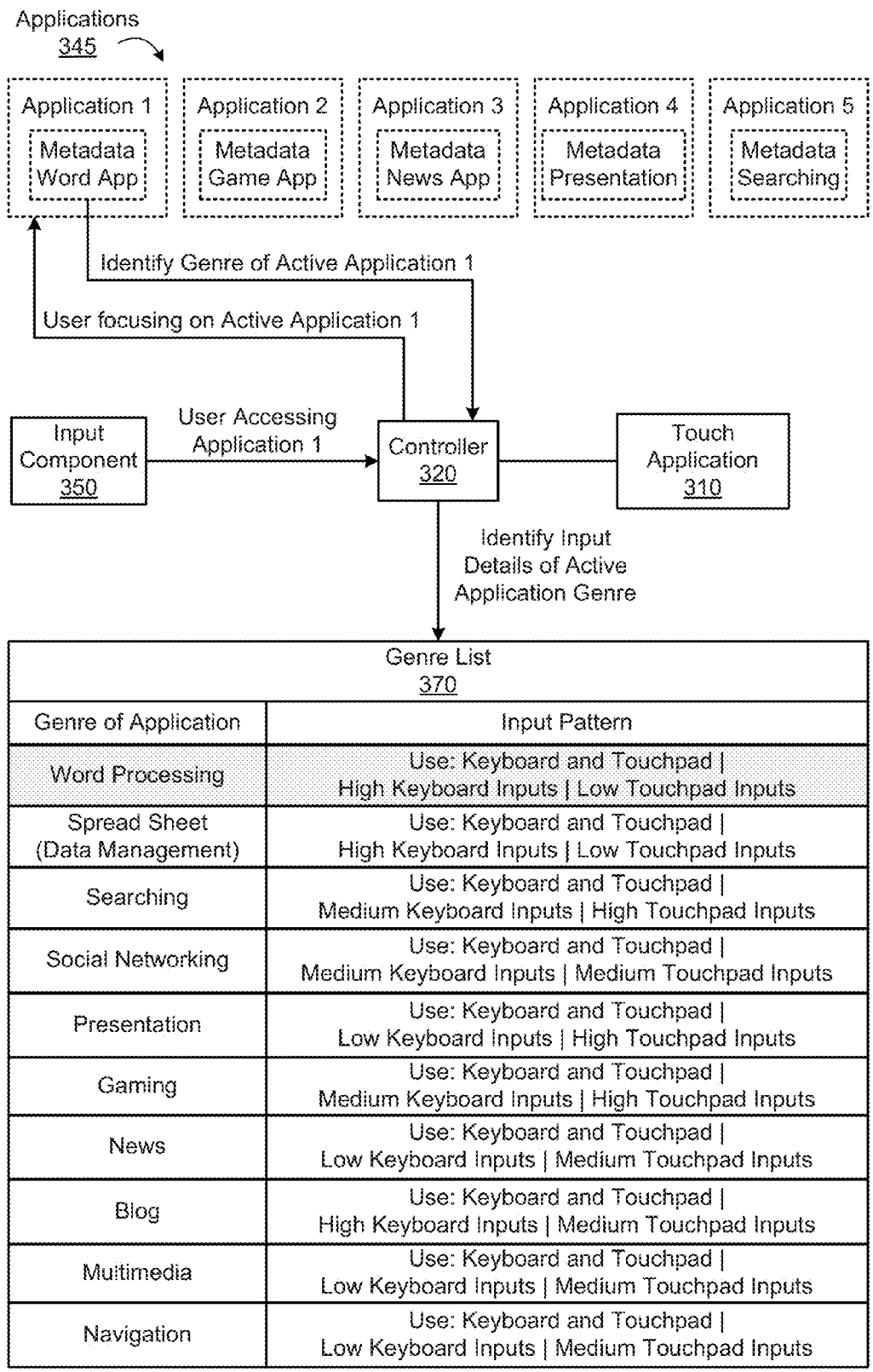
FIG. 3 illustrates a block diagram of a touch application identifying input details of an active application according to an embodiment.

FIG. 3 illustrates a block diagram of a touch application 310 identifying input details of an application 345 according to an embodiment. As shown in the present embodiment, Application 1, Application 2, Application 3, Application 4, and Application 5 are detected by the controller 320 and/or the touch application 310 to be executed or rendered on the device. In response, the controller 320 and/or the touch application 310 proceed to identify which of the applications 345 of the device is active.

As illustrated in FIG. 3, the controller 320 and/or the touch application 310 have detected the user to be accessing Application 1 with input component 350. In response, the controller 320 and/or the touch application 310 identify that Application 1 is active. In another embodiment, the user can use the touchpad of the device to access Application 1. In other embodiments, the controller 320 and/or the touch application 310 can identify an active application 345 by the user using any additional method noted above.

The controller 320 and/or the touch application 310 proceed to access metadata of active Application 1 to identify a genre of active Application 1. A genre of an application corresponds to a type or a category of the application. As noted above, a genre of an application can be word processing, data management, searching, social networking, presentation, gaming, news, and/or multimedia. In other embodiments, the application can be additional genres of applications in addition to and/or in lieu of those noted above.

The metadata of an active application 345 can list the genre of the active application. In another embodiment, the metadata can list a name of the active application and the controller 320 and/or the touch application 310 can identify the genre based on the name of the active application. As shown in the present embodiment, the metadata of active Application 1 identifies that active Application 1 is word processing application. As a result, the genre of active Application 1 is word processing. In response to identifying the genre of active Application 1, the controller 320 and/or the touch application 310 proceed to identify an input pattern or input details associated with the genre, word processing.

As shown in FIG. 3, the controller 320 and/or the input application 310 can access a genre list 370 to identify the input pattern. The genre list 370 includes one or more genres of applications. Additionally, the genre list 370 includes corresponding input details for each of the genres. The input details can specify whether the genre of the application 345 receives input from the touchpad and/or the input component. Additionally, the input details can specify whether the genre of the application 345 receives more input from the touchpad or the genre of the application 345 receives more input from the input component.

As shown in the present embodiment, the controller 320 and/or the touch application 310 identify that the genre, word processing, receives input from both the input component (keyboard) and the touchpad. Additionally, the amount of the inputs from the keyboard is high, while the amount of inputs from the touchpad is low. As a result, the controller 320 and/or the touch application 320 determine that active Application 1 receives input from both the keyboard and the touchpad, however active Application 1 receives more input from the keyboard as opposed to the touchpad. In response to identifying the genre and the input pattern of an active application, the controller 320 and/or the touch application 310 proceed to modify one or more settings of the touchpad, such as a palm check setting.

In another application, the controller 320 and/or the touch application 310 can identify a genre of the active application 345 by detecting a user entering text and/or character input with an input component of the device, such as a keyboard. The controller 320 and/or the touch application 310 can log or record the inputs for the active application 345 from the user. The controller 320 and/or the touch application 310 can then apply a text, character, and/or word detection algorithm to inputs from the user. The detection algorithm can detect an amount and/or frequency of inputs, for the controller 320 and/or the touch application 310 to identify the input pattern of the active application 345.

Figure 4A:
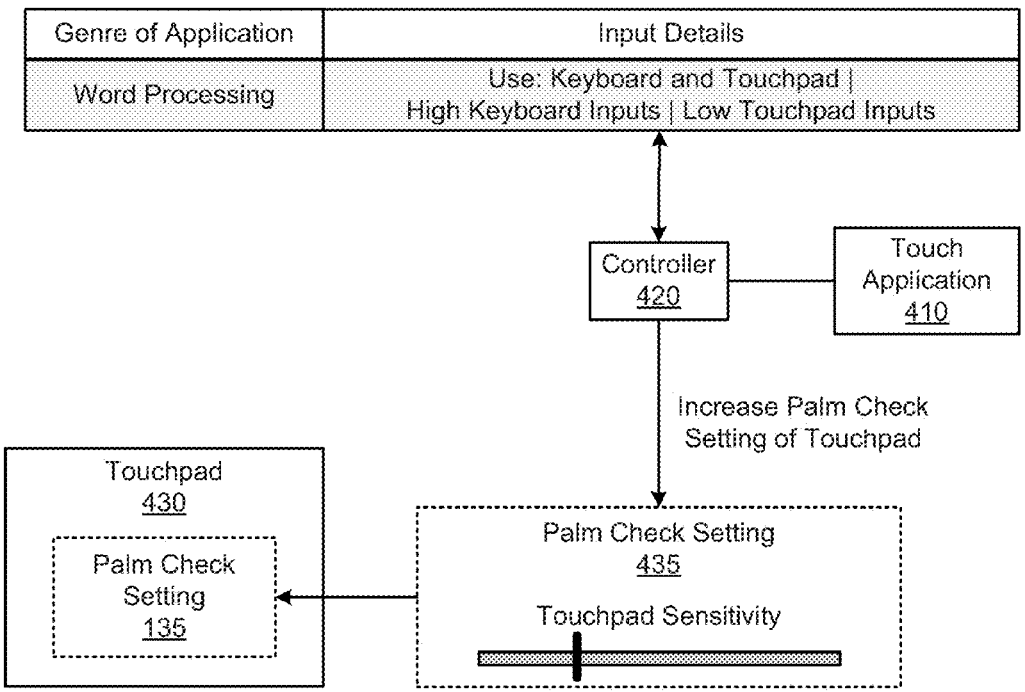
FIGS. 4A and 4B illustrate block diagrams of a touch application modifying a palm check setting of a touchpad according to embodiments.
Figure 4B:
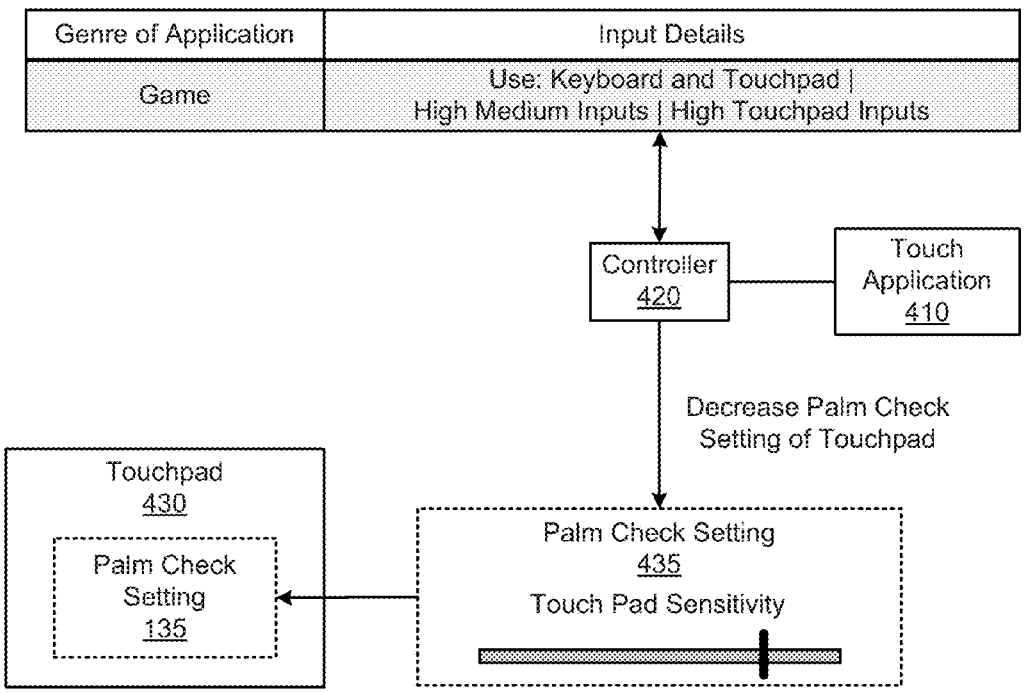

FIGS. 4A and 4B illustrate block diagrams of a touch application 410 modifying a palm check setting 435 of a touchpad 430 according to embodiments. As noted above, a palm check setting 435 of the touchpad 430 is a setting or profile associated with a sensitivity of the touchpad 430 to reject accidental inputs of the device resulting from the user accidentally touching or contacting the touchpad 430. The sensitivity of the touchpad 430 can correspond to a time delay before a touch is registered as an input for the device, an amount of pressure before the touch is registered as an input for the device, and/or an amount of surface area touched before the touch is registered as an input for the device. The touchpad 430, the controller 420, and/or the touch application 410 can detect an amount of time which the touchpad 430 is touched, an amount of pressure of the touch, and/or an area of the touch.

The palm check setting 435 can be modified by the controller 420 the touch application 410, and/or the touchpad 430 based on a genre and/or input pattern of an active application. The controller 420 and/or the touch application 410 can increase the palm check setting 435 if an active application receives input from both the touchpad 430 and an input component (keyboard) and the active application receives more input from the keyboard as opposed to the touchpad. By increasing a palm check setting 435 of the touchpad 430, an amount of accidental inputs from a user can be reduced in response to the touchpad 430 detecting or registering fewer accidental touches from the user.

As noted above, the user can accidentally touch the touchpad 430 if the user is resting their palm or hand on the touchpad 430 as they are using another input component of the device. Additionally, the user can accidentally touch the touchpad if the user accidentally brushes against the touchpad 430 while using another input component of the device. Additionally, the controller 420 and/or the touch application 410 can decrease the palm check setting 435 if the active application receives more input from the touchpad 430 as opposed to the keyboard. By decreasing a palm check setting 435, an accuracy of the touchpad 430 can be increased.

As shown in FIG. 4A, the controller 420 and/or the touch application 410 have detected a genre of the active application to be word processing. Additionally, an input pattern of the word processing genre identifies that the active application receives input from both the touchpad 430 and the input component (keyboard) and the active application receives more input from the keyboard as opposed to the touchpad 430. In response, the controller 420, the touch application 410, and/or the touchpad 430 proceed to increase the palm check setting 435.

In one embodiment, increasing the palm check setting 435 can include disabling the touchpad 430 or a portion of the touchpad 430 where a user may accidentally touch. The portion of the touchpad 430 disabled can include a top portion, a bottom portion, a left portion, a right portion, and/or corner of the touchpad 430. By disabling the touchpad 430 or a portion of the touchpad 430, the amount of accidental inputs resulting from a user touching the touchpad 430 while entering inputs with another input component can be reduced.

In another embodiment, as illustrated in FIG. 4A, increasing the palm check settings 435 can include reducing the sensitivity of the touchpad 430 or a portion of the touchpad 430. Reducing the sensitivity can include creating a rule for the touchpad 430 to remain touched for a period of time or for a pressure of the touch to exceed a predefined pressure before an input is detected or registered. In another embodiment, when reducing the sensitivity, the controller 420 and/or the touch application 410 can increase a current time delay and/or current pressure of the touchpad. In other embodiments, when reducing the sensitivity, the controller 420 and/or the touch application can increase an amount of surface area to be touched before an input is registered.

The period of time can be microseconds and can be defined by the controller 420, the touch application 410, and/or a user of the device. Additionally, the predefined pressure can be defined by the controller 420, the touch application 410, and/or a user. Further the amount of increase for the surface area can be defined by the controller 420, the touch application 410, and/or a user of the device.

In another embodiment, as illustrated in FIG. 4B, the controller 420 and/or the touch application 410 detect the genre of the active application to be gaming. Additionally, an input pattern of the gaming genre identifies that the active application receives input from both the touchpad 430 and the input component (keyboard) and the active application receives more input from the touchpad 430 as opposed to the keyboard. In response, the controller 420 and/or the touch application 410 proceed to decrease the palm check setting 435.

As shown in the present embodiment, decreasing the palm check setting 435 can include increasing a sensitivity of the touchpad 430. Increasing the sensitivity of the touchpad 430 can include reducing an amount of time for the touchpad 430 to be contacted before an input is detected or registered. In another embodiment, increasing the sensitivity can include reducing a pressure threshold for the touchpad 430. In other embodiments, the controller 420 and/or the touch application can increase the sensitivity by reducing an amount of space or area to be touched on the touchpad 430 before an input is registered. The controller 420 and/or the touch application 410 can decrease the palm check setting 435 using other methods in addition to and/or in lieu of those noted above and illustrated in FIG. 4B.

Figure 5:
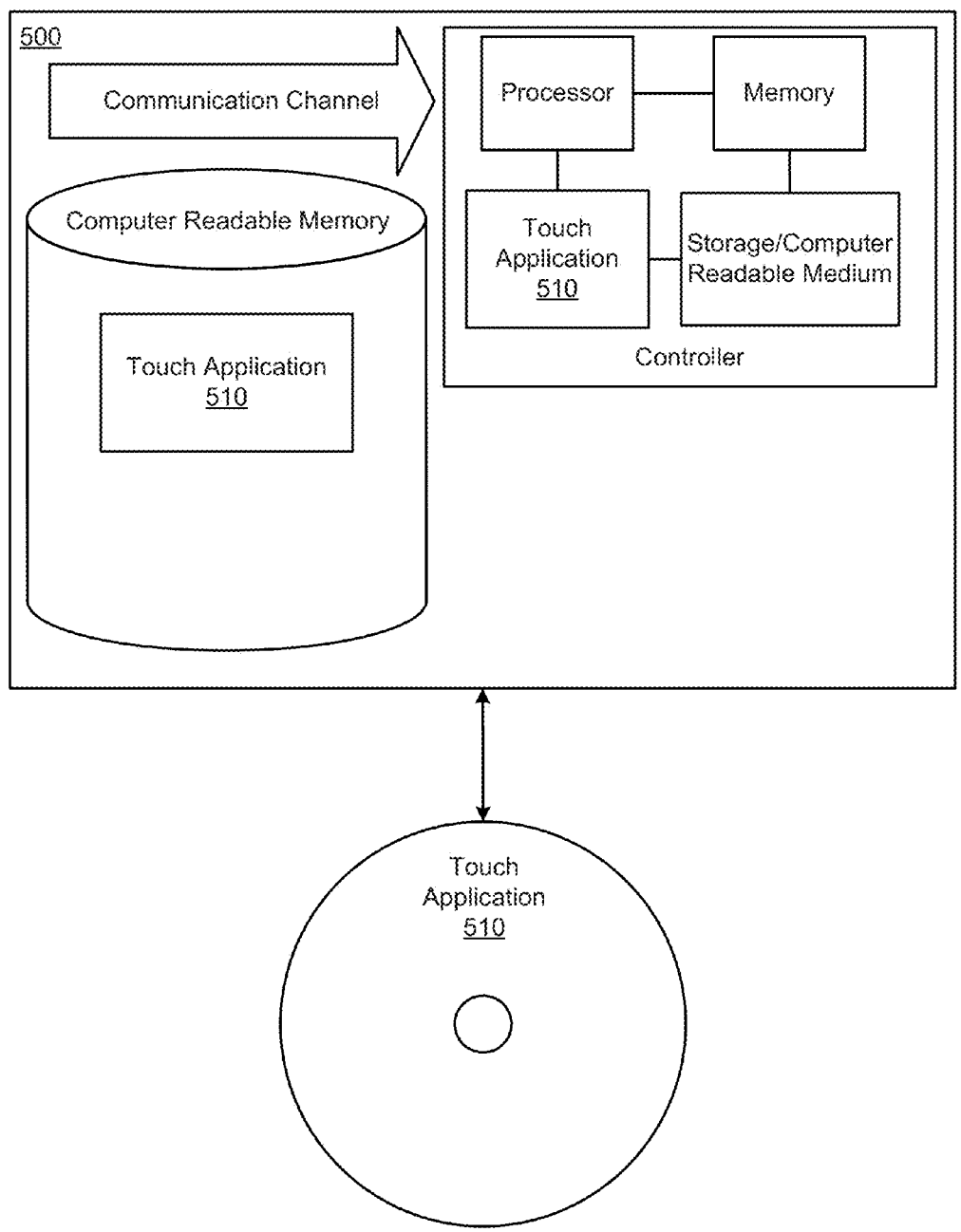
FIG. 5 illustrates a device with a touch application and a touch application stored on a removable medium being accessed by the device according to an embodiment.

FIG. 5 illustrates a device 500 with a touch application 510 and a touch application 510 stored on a removable medium being accessed by the device 500 according to an embodiment. For the purposes of this description, a removable medium is any tangible apparatus that contains, stores, communicates, or transports the application for use by or in connection with the device 500. As noted above, in one embodiment, the touch application 510 is firmware that is embedded into one or more components of the device 500 as ROM. In other embodiments, the touch application 510 is a software application which is stored and accessed from a hard drive, a compact disc, a flash disk, a network drive or any other form of computer readable medium that is coupled to the device 500.

Figure 6:
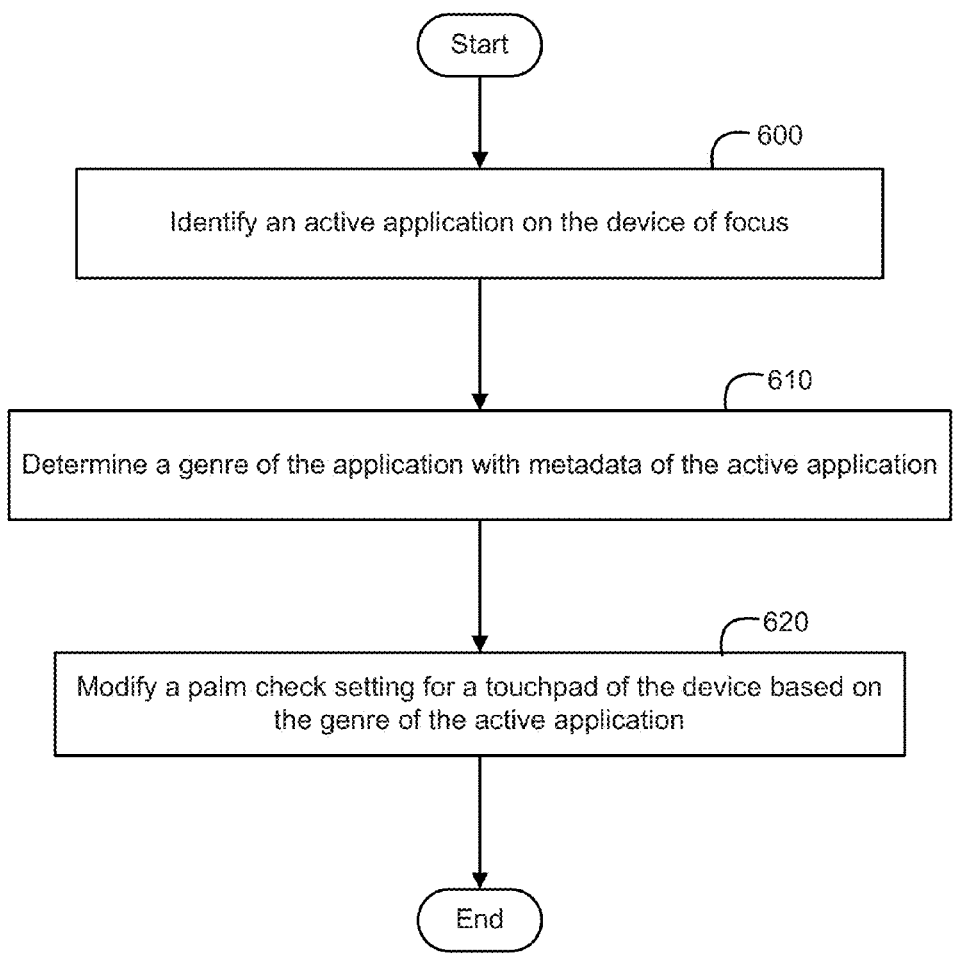
FIG. 6 is a flow chart illustrating a method for managing a touchpad according to an embodiment.

FIG. 6 is a flow chart illustrating a method for managing a touchpad according to an embodiment. The method of FIG. 6 uses a device with a controller, a touchpad, at least one application, and a touch application. In other embodiments, the method of FIG. 6 uses additional components and/or devices in addition to and/or in lieu of those noted above and illustrated in FIGS. 1, 2, 3, 4, and 5.

As noted above, the touch application can independently or in conjunction with the controller manage the touchpad by modifying one or more settings of the touchpad, such as palm check setting. The touchpad is a hardware input component of the device configured to detect and/or register inputs for the device in response to the user touching the touchpad. The palm check setting can be modified based on a genre and/or an input pattern of an active application of the device. The controller and/or the touch application can initially identify an active application on the device at step 600.

As noted above, an active application can be identified if a single application is executed or rendered on the device, if an application overlaps other applications but is not overlapped, and/or if a user has accessed the application with the touchpad and/or the input component. In response to identifying the active application, the controller and/or the touch application can identify a genre of the active application using metadata of the application at step 610.

The metadata can list a genre of the active application. In another embodiment, the metadata can list a name of the active application and the controller and/or the touch application can identify the genre of the active application with the name of the active application. Based on the genre of the active application, the controller and/or the touch application can identify an input pattern of the genre of the active application. The input pattern can identify whether the active application receives input from the touchpad and/or the input component. Additionally, the input pattern can identify whether the active application receives more input from the touchpad or receives more input from the input component.

Based on the genre and/or input pattern of the active application, the controller and/or the touch application can modify a palm check setting of the touchpad at step 620. As noted above, the palm check setting can be increased for the touchpad to detect fewer accidental inputs from the user if the active application of focus receives more input from the input component as opposed to the touchpad. Additionally, the palm check setting can be decreased for an accuracy of the touchpad to be increased if the active application of focus receives more input from the touchpad as opposed to the input component. The method is then complete. In other embodiments, the method of FIG. 6 includes additional steps in addition to and/or in lieu of those depicted in FIG. 6.

Figure 7:
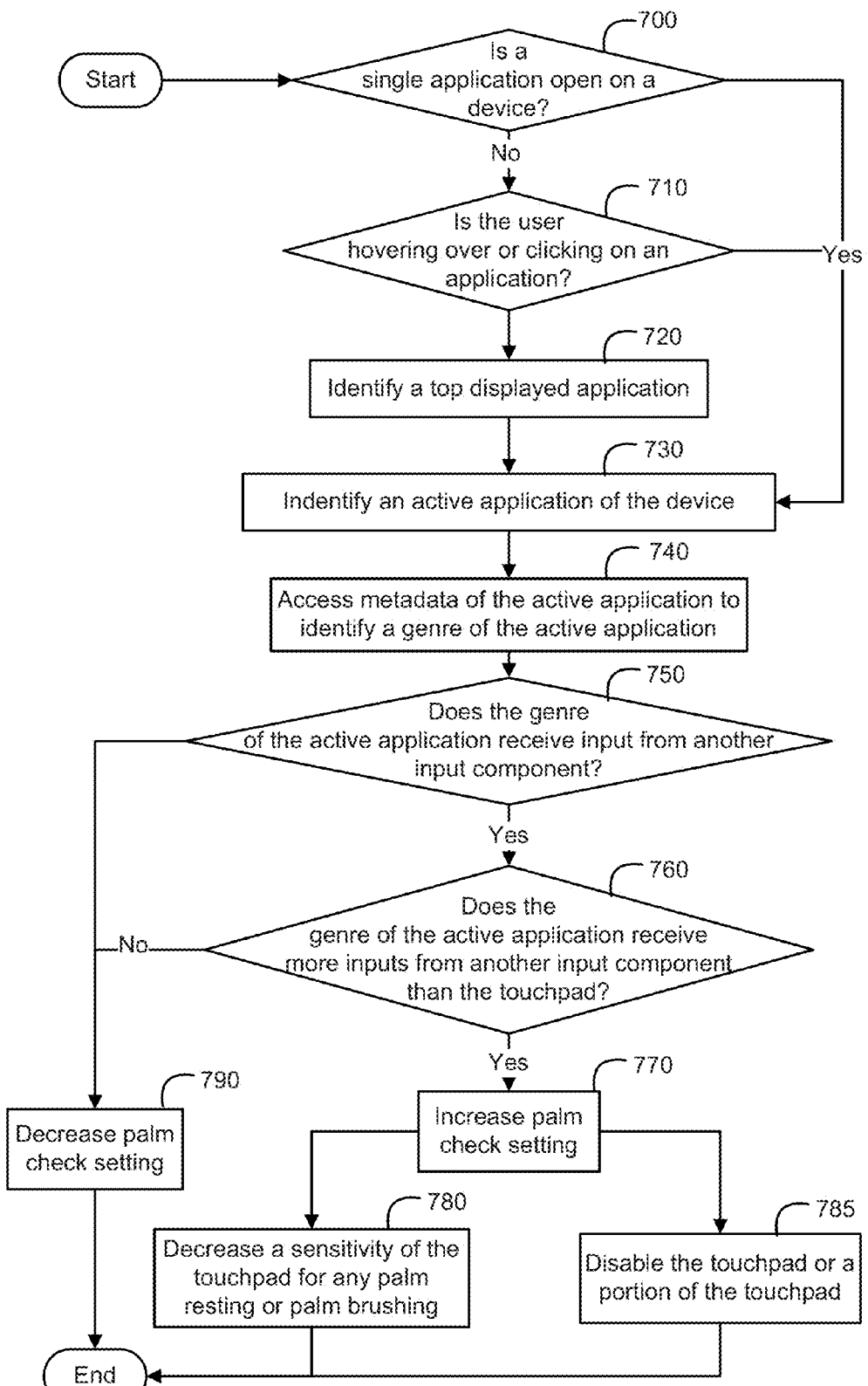
FIG. 7 is a flow chart illustrating a method for managing a touchpad according to another embodiment.

FIG. 7 is a flow chart illustrating a method for managing a touchpad according to another embodiment. Similar to the method of FIG. 6, the method of FIG. 7 uses a device with a controller, a touchpad, at least one application, and a touch application. In other embodiments, the method of FIG. 7 uses additional components and/or devices in addition to and/or in lieu of those noted above and illustrated in FIGS. 1, 2, 3, 4, and 5.

The controller and/or the touch application can initially identify an active application of a device. The controller and/or the touch application can determine whether a single application is rendered and/or executed on the device at step 700. If a single application is rendered or executed on the device, the controller and/or the touch application will identify the corresponding application as the active application at step 730.

If more than one application is executed or rendered, the controller and/or the touch application can determine whether a pointer or cursor is hovering over any of the applications in response to the user accessing the corresponding application with the input component or the touchpad at step 710. If an application has been accessed by the user clicking on or selecting the application with the touchpad or input component, the controller and/or the touch application will identify the corresponding application to be the active application at step 730.

If the user is not accessing an application with the touchpad or the input component, the controller and/or the touch application can identify which application is the top application at step 720. As noted above, the top application is an application which overlaps other applications and is not overlapped by any another other application. The top application will be identified by the controller and/or the touch application to be the active application at step 730.

In response to identifying the active application, the controller and/or the touch application access metadata of the active application of focus to identify a genre of the active application at step 740. Based on the genre of the active application, the controller and/or the touch application identify an input pattern of the active application and the genre of the active application. As noted above, when identifying the input pattern, the controller and/or the touch application can determine whether the genre of the active application receives input from another input component, such as a keyboard or if the genre of the active application receives more input from the touchpad as opposed to the other input component at step 750.

If the genre of the active application does not receive input from another input component, the controller and/or the touch application can decrease the palm check setting of the touchpad at step 790. As noted above, decreasing the palm check setting can include increasing a sensitivity of the touchpad to increase an accuracy of the touch pad. In another embodiment, if the genre of the active application receives input from both the touchpad and another input component, the controller and/or the touch application can determine whether the genre of the active application receives more inputs from the other input component as opposed to the touchpad at step 760.

If the genre of the active application receives more input from the touchpad, the controller and/or the touch application can decrease the palm check setting of the touchpad at step 790. In another embodiment, if the genre of the active application receives more input from the other component, the controller and/or the touch application can increase the palm check setting of the touchpad at step 770. As noted above, the controller and/or the touch application can reduce a sensitivity of the touchpad when increasing the palm check setting at step 780. In another embodiment, the controller and/or the touch application can disable the touchpad or a portion of the touchpad at step 785. The method is then complete. In other embodiments, the method of FIG. 7 includes additional steps in addition to and/or in lieu of those depicted in FIG. 7.

What is claimed is:

1. A method for managing a touchpad comprising:
   identifying an active application on a device;
   determining a genre of the active application with metadata of the active application;
   determining whether the genre of the active application is associated with receiving either a high amount of inputs from a keyboard component or receiving a low amount of inputs from the keyboard component; and
   modifying a palm check setting for a touchpad of the device based on the genre of the active application and the amount of inputs from the keyboard component.

2. The method for managing a touchpad of claim 1 wherein identifying an active application includes determining whether a user has accessed an application with an input component of the device.

3. The method for managing a touchpad of claim 1 wherein determining the genre of an application includes determining whether the application is at least one of a word processing application, a spread sheet application, a searching application, a social networking application, a presentation application, a game application, a sports application, and a multimedia application.

4. The method for managing a touchpad of claim 1 wherein modifying a palm check setting for the touchpad includes increasing a sensitivity of the touchpad.

5. The method for managing a touchpad of claim 1 wherein modifying a palm check setting for the touchpad includes decreasing a sensitivity of the touchpad.

6. A device comprising:
   a touchpad to detect inputs for the device; and
   a controller to identify an active application and identify a genre of the application with metadata of the active application;
   wherein the controller additionally determines whether the genre of the active application is associated with receiving either a high amount of inputs from a keyboard or receiving a low amount of inputs from the keyboard
   wherein the controller additionally modifies a palm check setting of the touchpad based on the genre of the active application and the amount of inputs from the keyboard.

7. The device of claim 6 further comprising an input component to detecting inputs for the device, wherein the input component includes at least one the keyboard, an image capture component, and a microphone.

8. The device of claim 6 further comprising a display component to render the active application.

9. The device of claim 6 wherein an application is identified by the controller to be an active application if a user interface of the active application is displayed on a display component.

10. The device of claim 6 wherein the active application is identified to be in focus if a cursor of a user interface of the device hovers over the application.

11. The device of claim 6 wherein modifying the palm check setting includes disabling the touchpad.

12. The device of claim 6 wherein modifying the palm check setting includes disabling a portion of the touchpad.

13. A non-transitory computer readable medium comprising instructions that when executed cause a controller to:
  identify an active application of a device in response to detecting the user accessing an input component of the device;
  determine a genre of the active application with metadata of the active application;
  determine whether the genre of the active application is associated with receiving either a high amount of inputs from a keyboard component or receiving a low amount of inputs from the keyboard component; and
  modify a palm check setting for a touchpad of the device based on the genre of the active application and the amount of inputs from the keyboard component.

14. The computer readable medium comprising instructions of claim 13 wherein the controller determines from the genre of the active application whether the active application receives input from both the touchpad the keyboard component of the device.

15. The computer readable medium comprising instructions of claim 14 wherein the controller determines from the genre of the active application whether the active application receives more input from the touchpad or the keyboard component.

16. The computer readable medium comprising instructions of claim 15 wherein the controller increases the palm check setting for the touchpad to ignore a palm of the user resting on or brushing against the touchpad if the active application receives more input from the keyboard component.

17. The computer readable medium comprising instructions of claim 15 wherein the controller decreases the palm check setting for the touchpad if the application receives more input from the touchpad.

18. The computer readable medium comprising instructions of claim 13 wherein the controller restores the palm check setting for the touchpad if the active application is no longer determined to be in focus.

* * * * *